United States Patent [19]

Boeckmann

[11] Patent Number: 4,719,648
[45] Date of Patent: Jan. 12, 1988

[54] COIN RELAY DRIVE AND SWITCHING CIRCUIT FOR PAYSTATION TELEPHONE INSTRUMENTS

[76] Inventor: Eduard F. B. Boeckmann, 815 Eldorado Ave. SE., Huntsville, Ala. 35802

[21] Appl. No.: 808,773

[22] Filed: Dec. 13, 1985

[51] Int. Cl.⁴ .............................................. H04M 1/00
[52] U.S. Cl. .................................... 379/155; 379/132; 379/150
[58] Field of Search ....... 179/6.3 R, 6.3 CC, 6.3 MA, 179/6.31, 6.4; 379/132, 143, 150, 152–153, 155

[56] References Cited

U.S. PATENT DOCUMENTS 4,198,545  4/1980  Haist et al. .......................... 379/132
4,361,731  11/1982  Smoot ................................. 379/154

Primary Examiner—Gene Z. Rubinson
Assistant Examiner—Mark E. Ham

[57] ABSTRACT

A telephone paystation coin refund and collect circuit for operating a coin relay with power obtained from a two-wire business telephone line. The circuit employed utilizes charge storage capacitors and MOS-FET transistors for current pulsing of the relay coil with current flow in either direction as determined by a signal from an associated microprocessor controller.

1 Claim, 1 Drawing Figure

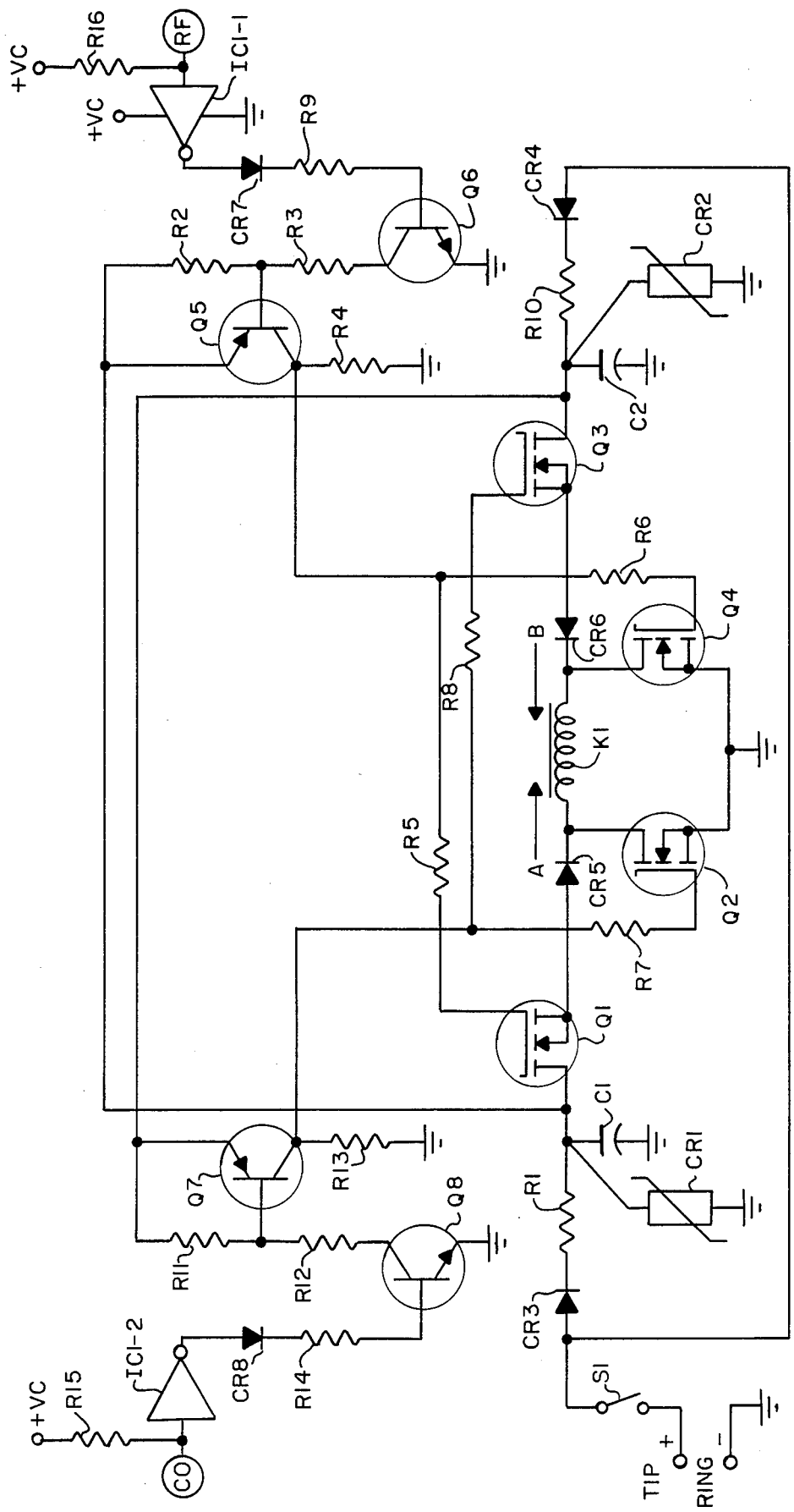

COIN RELAY DRIVE AND SWITCHING CIRCUIT FOR PAYSTATION TELEPHONE INSTRUMENTS

BACKGROUND OF THE INVENTION

(1) Technical Field

The present invention relates to coin operated telephones and more particularly to coin operated relay device circuitry as used in prepay type telephone paystations.

(2) Background Art

Quite a number of different devices have been used to collect or refund coins deposited in telephone paystations. For example, in the current type 102B telephone paystation as manufactured by GTE Communication Systems, a single coil solenoid is used with a magnetic actuator. Depending on the direction of current supply to the solenoid coil, the magnet is either attracted or repelled from one magnetic pole to the solenoid, thereby causing either the collect or refund operation mode of the device.

Another type of coin relay used on the type 62 and type 82 prepay paystations manufactured by Automatic Electric Company, consisted of two coils, a permanent magnet between the coils and a centrally located armature mounted above the coils and magnet. The armature would then pivot to either side as determined by the polarity of the direct current applied to the relay coils. The position of the armature would then determine the coin collect mode or refund mode.

Both the single-coil solenoid device and the double-coil device require high voltages and currents to operate under control of an operator located at the telephone central office. A minimum of 48 volts and 44 milliamps of current are required to operate the device included in the current type 120B coin telephone referred to above. Another coin relay made by Northern Electric Company type P10E786 is similar in operation and construction to that utilized in the type 120B telephone noted above.

The automatic telephone exchange associated with coin telephones of previous design in prepay operation must of necessity be equipped with coin control repeaters, sources of positive and negative 110 volts DC for use as collect or refund battery and an interrupter that produces intermittent coin-control current for application to the telephone line. Upon lifting the handset in such an arrangement the calling party is connected to the central office and dial tone is usually heard. At this point the calling party now deposits the initial rate deposit and may dial the call in the usual manner. Upon termination of a call, the central office then sends either collect or refund battery to the telephone, depending upon whether the call was completed or was incomplete. If the call was completed, operation of the coin relay directs the coins into the cash vault included in the telephone paystation. If the call, however, was incomplete the coins are then directed into the coin return receptacle for return to the user. After the coins have been collected or refunded, the telephone is returned to its normal condition, that is to say it is ready for another call.

On an operator assisted calls, the initial rate amount is refunded upon connection to the operator. The toll operators then supervise collection of coins by audible signals generated by an audio oscillator located within the telephone. The operator controls the application of the coin collect or refund signals from the central office on all toll calls.

When the calling party deposits coins, the coins are directed into a coin accepter-rejector mechanism. After the coins clear that mechanism, they pass through a coin chute, that contains in modern design units, three trigger switches, one for each of the three denominations of coins utilized (5 cent, 10 cent, and 25 cent). When the coins actuate the trigger switches in the coin chute, the trigger switches close a path to a totalizer. The action of the totalizer is not pertinent to the present invention. However it is noted that the first coin in its path to the coin chute cause the triggering of the coin relay and operates a set of contacts that prepare a ground path to the transmission network. When the initial rate has been deposited, the totalizer causes the two relays to operate thereby enabling the rotary dialer touch calling unit (TCU) and extending coin relay ground to the transmission network. At this time, the central office is prepared to receive address signalling from the dial or touch calling unit.

In existing typical paystations such as the type 120B manufactured by GTE Communication Systems, passage of a coin into the hopper forces the coin trigger downward in the hopper slot, tripping it to permit the coin operated contacts at the rear of the spring pileup to assume their rest position. The first operating set of contacts remove a short circuit from the dial pulse springs or a low resistance shunt from the oscillator of the touch calling unit connected at two fixed terminals. The other contacts connect ground to the line instead of to the relay coil. After the coin is past, the trigger is prevented from restoring fully by the tilt of the lever spring of the make contact set. If a −110 volts DC refund potential is applied to the line, the polarity of the flux generated by the core of the relay coil is such as to cause the left end of a small bar magnet to be attracted to the left extension of the core or pole piece, this tilts a nylon selector card slightly so that as it is moved down by a rocker arm, it moves a cam and therefore a nylon hopper vein to the right. Meanwhile, the downward motion of the card is imparted to a trap lever, which pivots on its pin and moves its upper edge outward. This permits the nylon coin trap pivoted above the lever, to swing down inside the hopper, so the coin deposit falls against the left side of the vein and passes into the refund chute. If a +110 volts DC collect potential is applied to the line, the flux generated at the pole piece extensions are such as to attract the right end of the selector card magnet, against the right side of the vein into the coin receptacle.

As the relay armature operates the selector cards of the rocker arm, it also moves the spring lift to place 1,000 Ohm resistance in series with the coil and then short-circuits the coil. The resistance thus takes the place of the coil in the path of the coin control current, stabilizing the latter to prevent damage to the ground contacts when they open and to resistance lamps in the supply circuit at the central office. At the end of its stroke, the spring lift provides substantial pull to the coin operated ground contacts, so that the tilt of the lever spring no longer interferes with the trigger, which restores completely to normal under the force of a coil spring in torsion. The dial or touch calling unit shunting springs are forced close. With the relay shorted the current induced by the collapsing field tends to retard the decay of the flux in the core and makes the armatures slow to release. As it begins to restore, the spring lift permits the coin operated springs to retrieve from their over travel position. This prevents the break (either from the dial or from the touch calling unit shunt) contacts sets from reopening and allows the make (ground) contact set to open. As the ground path is opened the relay is disconnected from the coin battery circuit, thus extinguishing the coin pilot lamp if collection of refund is being controlled through a manual switchboard and preventing reoperation of the relay if the operator or control circuit continues application of coin batteries to the line. Finally, the transfer context set is restored to remove the short circuit from the relay coil and bypass the series resistor. The upward motion of the selector card during release acts to return the coin trap to horizontal and the hopper vein to its neutral vertical position in preparation for the next deposit.

From the forgoing it will be obvious that existing state-of-the-art coin collect and refund devices and the circuits associated therewith require high voltages and currents to operate and control by an operator or from central office equipment. Accordingly, it is the object of the present invention to provide a new circuit to be included in the telephone instrument for stand alone operation on a two-wire business line (not requiring operator or central office control).

SUMMARY OF THE INVENTION

The present invention consists of a solid state switch and capacitor circuit to provide a current pulse to the coil of a coin relay with current flow switchable to either direction in the coil. Two high value capacitors are used to store sufficient charge to perform a collect operation and a refund operation of the relay, as required during one off-hook period. The capacitors are charged in a brief period of time during a transition from on-hook to off-hook states in the intelligent terminal or paystation. By use of the term intelligent hereinafter it will used to indicate that the paystation requires no external control signals from the telephone central office. Diodes are used to prevent discharge of the capacitors into the telephone loop under fault or similar conditions. Metallic oxide varistors are used to protect the capacitors and other parts of the circuit during lightning surge condition. N-enhancement mode MOS-FET transistors are used to switch the capacitor charges into the coin relay coil in the desired conduction direction on command of an associated microprocessor controller system contained in such intelligent paystations. Additional diodes are used to steer current in the desired direction thru the relay coil. Two type 74HC04 logic inverter integrated circuits are used to trigger the circuit responding to one of two signal lines from the aforementioned microprocessor system. It should be noted that the details of the microprocessor control circuitry have not been shown in as much as they do not form a portion of the present invention. It would only be required that they provide outputs on the two signal lines noted above. The inverters operate two transistors, one of the NPN type and the other PNP type, supplied with voltage from the charged capacitor to trigger the capacitor discharge itself, thereby requiring no additional source of voltage other than the voltage supplied for the inverters and the microprocessor system, which is derived from the telephone line in the anticipated version of the present system.

Both ends of the relay coil are switched in the present invention. One end is switched to the capacitor terminal and the other end switched to common, with both types of switches at both ends of the relay. The switches described are the above noted MOS-FET transistors. Thus four switches are therefore required to perform the switching with current reversal capability.

A particular feature of the present invention is the inclusion of a requirement for an active signal to trigger a discharge and subsequent operation of the relay. Therefore the possibility of initialization problems or false triggering of the circuit is greatly reduced. Another object of the present invention is the inclusion of the capability to switch either refund or collect modes without effecting the mode not switched. Also the capacitors will charge whether or not the inverters have an active supply voltage at the time charging starts. The circuit also includes the property of low leakage so that the charged capacitors retain their charge for a long period of time. The capacitors are normally disconnected from the telephone line during on-hook periods and are also disconnected from the line during address signalling and voice mode, to prevent impedance loading error on the telephone, loops and instrument.

BRIEF DESCRIPTION OF THE DRAWINGS

The single sheet of accompanying drawings is a simplified schematic diagram of the circuit in accordance with the present invention. Details of the telephone instrument, telephone loop and microprocessor controller have not been shown in as much as they do not form a portion of the present invention.

DESCRIPTION OF THE PREFERRED EMBODIMENT

Referring to the accompanying drawing, the principle components of the present invention include the coin relay K1 whose coil only is shown in as much as the operating portions other than the coil function like those described for the prior art and do not form a portion of the present invention. Controlling the direction of current flow in the coin relay coil are transistors Q1, Q2, Q3, and Q4 which are MOS-FET N-enhancement mode transistors. Transistors Q5 and Q7 are PNP transistors for triggering the charge to be applied from the capacitors to the control transistors. Diodes CR7 and CR8 function as steering diodes with the interface between the associated microprocessor being made at terminals RF and CO through inverters IC1-1 and IC1-2 and transistors Q6 and Q8. Diodes CR3 and CR4 prevent the dumping of capacitor charge onto the telephone loop and or the telephone instrument.

A further understanding of the present invention will be had by reference to the following description in which the mode of operation will be described.

Initially the circuitry at the left hand side of the drawing will be discussed. Capacitor C1 is charged during the on-hook state (switch S1 closed), from over the telephone line which is connected but not shown at terminals designated Tip-and-Ring. Capacitor C1 is charged through diode CR3 when the telephone is in the on-hook state. This is done because the line voltage should normally be at this point in the 48 to 56 volt range. A minimum of 30 volts has been determined as required in a practical implementation of the present circuit. Actually only three seconds are normally required to obtain sufficient charge for the present circuitry to be operational. If the user of the telephone goes off-hook at this time, the hookswitch S1 will be opened with the Tip-and-Ring being connected to telephone circuitry which is not shown because it does not form a portion of the present invention. At this time, capacitors C1 and C2 are disconnected from the telephone loop and the instrument of course is in the address signalling or voice communication mode. Capacitors C1 and C2 are charged but transistors Q1 and Q3 are maintained in the off-state by transistors Q5 and Q7 which are maintain in the "off" condition because transistors Q6 and Q8 have not yet been activated. It should be noted that capacitor C2 was charged from the telephone line in similar manner to that of capacitor C1 except through diode CR4.

Now assuming that a refund operation of the relay is desired, it should also be assumed that current flow must flow in the direction indicated by the arrow A located above the coil K1 of the coin relay. To trigger the circuit and dump the charge on capacitor C1 through the coil, a logic low or zero signal must be applied to the active integrated circuit IC1-1. This is applied at terminal RF (Refund) from the microprocessor connected thereto. The manner in part of which this signal may be developed does not form a present the invention. To develop such signals is well within the capability of those skilled in the art. The application of the logic low or zero signal to integrated circuit IC1-1 develops a logic high or positive output voltage which in turn turns on transistor Q6 with signal voltage through diode CR7 and resistor R9. Transistor Q6 then provides the necessary bias current sink to turn on transistor Q5. Transistor Q5 then allows some of the voltage from the charged capacitor to reach the gate terminal of transistor Q1 through resistor R5 with current to common through resistor R4 to maintain the transistor Q5 on. Transistor Q1 is now turned on. Also voltage now reaches the gate of transistor Q4 by the same connection except through resistor R6. Therefore one end of the coil is now connected through transistor Q1 to the charged terminal of capacitor C1 and the other end of the relay coil is connected to common through transistor Q4 completing the circuit and allowing the capacitor charge to rapidly dump through the relay coil. The coil then operates the associated coin refund mechanism (not shown).

A similar sequence of events occurs to actuate the relay coil in the collect mode except the current flows through the coil in the direction indicated by the arrow B. In this case the transistors Q3 and Q2 are used to connect the coil to the charged terminal of capacitor C2 and to common. Integrated circuit IC1-2, transistor Q8 and transistor Q7 provide the trigger control for the collect action.

The metallic oxide varistors CR1 and CR2 protect the capacitors and the rest of the circuit except resistors R1 and R10 and diodes CR3 and CR4 from lightening surge damage. Resistors R1 an R10 are of sufficiently high value and wattage to protect diodes CR3 and CR4 by limiting current and thus it may be expected that they will not sustain any damage to the resistors themselves.

Resistors R15 and R16 provide a voltage pull-up for the correct logic at the inputs to integrated circuits IC1 and IC2 for the normal un-actuated state of the coin relay. Switch S1 is under control of the system microprocessor (not shown) to allow charging of the capacitors C1 and C2 required. This usually occurs when the instrument is first brought off-hook. Therefore may be assumed that S1 is released once the capacitors are charged. S1 is then opened to prevent interference with in the other telephone functions.

What is claimed is:

1. In an intelligent coin operated telephone of the type that is connected to a two wire business line, which includes a tip wire and a common wire, from the telephone central office, and that requires no external control signals from the telephone central office, a coin relay drive and switching circuit comprising:
   a coin relay coil having first and second terminals for causing a coin refund operation if supplied current flowing in a first direction and that causes a coin collect operation if supplied current flowing in a second direction;
   a first capacitor, having first and second terminals, with the second terminal connected to the common wire,
   a second capacitor, having first and second terminals, with the second terminal coupled to the common wire,
   charging means, connected to the tip wire and to the first terminals of the first and second capacitors for electrically coupling the first terminals of said first and second capacitors to the tip wire to charge said capacitors;
   first current directing means, including an RF terminal, adapted to receive a first signal at said RF terminal for connecting the first terminal of the first capacitor to the first terminal of the coin relay coil and for connecting the second terminal of the coin relay coil to common to direct current from the first capacitor through the relay coil in the first direction to cause a coin refund operation only when the first signal is received; and
   second current directing means, including a CO terminal, adapted to receive a second signal at the CO terminal for connecting the first terminal of the second capacitor to the second terminal of the coin relay coil and for connecting the first terminal of the coil relay coil to common to direct current from the second capacitor through the relay coil in the second direction to cause a coin collect operation only when the first signal is received, whereby only the selected capacitor is discharged during a coin collect or coin refund operation.

* * * * *